United States Patent
Weinberg et al.

(10) Patent No.: US 6,883,136 B1
(45) Date of Patent: Apr. 19, 2005

(54) SIMULTANEOUS DISPLAY AND FORMATTING OF DISPARATE VALUES IN A TABULAR FORM

(75) Inventors: Paul N. Weinberg, Los Angeles, CA (US); Dave L. Sullivan, North Hollywood, CA (US); Philip A. Tinari, Beverly Hills, CA (US); David E. Brookler, Los Angeles, CA (US); Ariel Hazi, Los Angeles, CA (US)

(73) Assignee: Azi, Inc., Los Angeles, CA (US)

( * ) Notice: Subject to any disclaimer, the term of this patent is extended or adjusted under 35 U.S.C. 154(b) by 941 days.

(21) Appl. No.: 09/643,207

(22) Filed: Aug. 21, 2000

Related U.S. Application Data

(60) Provisional application No. 60/149,855, filed on Aug. 19, 1999.

(51) Int. Cl.[7] ............................................... G06F 7/00
(52) U.S. Cl. ........................ 715/504; 715/505; 715/509
(58) Field of Search ................................ 715/503–509; 707/1, 102

(56) References Cited

U.S. PATENT DOCUMENTS

| | | | | |
|---|---|---|---|---|
| 5,739,824 A | * | 4/1998 | Dietrich et al. | 345/440 |
| 5,933,634 A | * | 8/1999 | Enokido et al. | 717/105 |
| 6,301,584 B1 | * | 10/2001 | Ranger | 707/103 R |
| 6,460,059 B1 | * | 10/2002 | Wisniewski | 715/503 |
| 6,613,099 B2 | * | 9/2003 | Crim | 715/523 |
| 6,640,234 B1 | * | 10/2003 | Coffen et al. | 715/538 |
| 6,690,399 B1 | * | 2/2004 | Carlson et al. | 715/771 |
| 2002/0023105 A1 | * | 2/2002 | Wisniewski | 707/503 |

OTHER PUBLICATIONS

Underdahl, B., "Using QuattroPro 6 For Windows" Special Edition, QUE, 1994, pp. 420–431.*

Eick et al, "Seesoft—A Tool For Visualizing Line Oriented Software Statistics", IEEE Trans. on Softw. Eng., vol. 18, No. 11, 11/92.*

"The Land Grant Training Alliance Online WP 6.1 Merge Lessons", http://www.lgta.org/wp61mrg/wp61.mrg.L3.all.htm, 1997, lesson 3.*

* cited by examiner

*Primary Examiner*—Stephen S. Hong
*Assistant Examiner*—Cesar B Paula
(74) *Attorney, Agent, or Firm*—Dalina Law Group P.C.

(57) ABSTRACT

The present invention provides for simultaneous display of a tabular and a form view of the records, (b) displaying multiple disparate values in a single control, and (c) formatting the values based on characteristics of the records.

21 Claims, 4 Drawing Sheets

Product Entry Form

- Manufacturer: ␣ —331
- Description: ␣ —332
- In Stock?: ␣ —334 (335)
- Rebate Avail.?: ␣ —335
- Complaints: ␣ —336

301

| Product ID | Manuf.'r | Description | Stock Avail. | Rebate Avail. | Complaint History |
|---|---|---|---|---|---|
| 1 | ACME | Computer | Y | | |
| 2 | ACME | Printer | Y | | |
| 3 | Apex | Computer | Y | Manuf.'r | |
| 4 | Best | Scanner | Y | | |
| 5 | Apex | Monitor | Y | Manuf.'r | |

SIMULTANEOUS DISPLAY AND FORMATTING OF DISPARATE VALUES IN A TABULAR FORM

This application claims the benefit of U.S. Provisional Application No. 60/149,855, filed Aug. 19, 2000.

BACKGROUND OF THE INVENTION

1. Field of the Invention

The present invention relates to a user interface for use in editing and verification of data, and, more particularly, to a user interface for use in editing and verifying data values wherein a format encoding is used for the values in the user interface to reflect characteristics of the underlying data used to populate the user interface.

2. Description of the Related Art

A DBMS (Database Management System) is used to manage data and is comprised of computer-executable code that may be used to define the structure of data and to access data within the defined structure. One example of a DBMS is a relational DBMS, or RDBMS. An RDBMS manages tables that make up a relational database as well as the data contained in the tables. In an RDBMS, data is organized in rows (or records) and columns (or fields) of the tables, and two or more tables may be related based on like data values. The intersection of a row and column in a table is referred to as a cell and contains the data value for a particular field of a particular record.

A DML (data manipulation language) such as SQL (Structured Query Language) is typically used to store, retrieve and modify data in a table. A schema defines the structure of a database, i.e., each table and the fields within a record of a table. A schema is itself considered data that is stored in one or more tables. Therefore, like other data in a database, a DML may be used to store, retrieve and modify the data in the database as well as the structure of a database.

Most database management systems use convenient data entry forms to allow a user to add or modify a single database record at a time. A problem arises when attempting either to edit multiple records simultaneously or to verify that a particular field has the same data value in a large number of records.

The traditional method of adding or modifying records in an RDBMS is to use a data entry form to view and edit a single record at a time, where each field in the database corresponds to a single field in the form. When adding a new record, the fields in the form are empty, to be filled in from scratch by the user. When modifying an existing record, the RDBMS places the existing values of the record into each of the fields of the form, and any or all of them can be modified by the user.

Some systems extend this scheme to allow the user to indicate that a change to the value in a particular field be further applied to all of the records in a previously selected set of records. A problem is that the single control for each field in the data entry form can display only a single value at a time, which makes it impossible for the user to easily determine before applying the change whether or not the existing data values for the field are all the same across the entire set of records.

Many systems allow the user to view and edit multiple records simultaneously by offering a row/column tabular view of the records in a table. The advantage of this approach is that multiple values for each field can be displayed simultaneously, and the user can quickly eyeball all the values for a field across the entire set of records by examining the contents of a particular column.

An advantage of this approach is that multiple values for each field can be displayed simultaneously, and the user can quickly view all the values for a field across the entire set of records by examining the contents of a particular column.

This approach works well when the number of records is small. When the number is larger than what can be displayed on a computer monitor at the same time, the user must browse through the entire record set. When the number of records is very large (for example, hundreds or even thousands of records), browsing through the record set is impractical and, for all intents and purposes, may be impossible.

Thus, it would be beneficial to have a mechanism to edit and/or verify any size or amount of data that may or may not include diverse data values while minimizing the need to browse through an entire record set to identify data values.

SUMMARY OF THE INVENTION

The present invention addresses the foregoing problems and provides a user interface for simultaneous display of a tabular and form view of data records and setting appearance characteristics of a value displayed in the user interface to reflect characteristics of the underlying data (i.e., the data records). For example, the present invention provides for displaying multiple disparate values in a single control (e.g., a display field of the user interface), and using different formatting codes (e.g., color coding) for the values based on the characteristics of the underlying data (e.g., whether there are empty values or multiple values in the data records).

In an aspect of the present invention, a method of displaying record data in a user interface is provided that comprises displaying a tabular portion of the user interface comprising plural data records, displaying a form portion of the user interface comprising a display field that corresponds to a field of the plural data records, determining whether to place a value in the display field, and formatting a value in the display field to reflect characteristics of the data contained in the plural data records.

Thus, the user can select some or all of a large set of records and determine from the representation of a value in the data entry form whether or not conflicts exist in the underlying data (i.e., the data from the set of selected data records) and in so doing, quickly verify that the values have been properly set.

The present invention contemplates using any type of formatting and/or encoding including, but not limited to, color, font type and/or size, bold, italic, underline, etc. For example, a value may be represented in a particular color to highlight a difference or sameness of the values for a field across the entire record set without concern for the values themselves.

This brief summary has been provided so that the nature of the invention may be understood quickly. A more complete understanding of the invention can be obtained by reference to the following detailed description of the preferred embodiment(s) thereof in connection with the attached drawings.

BRIEF DESCRIPTION OF THE DRAWINGS

FIG. 3 illustrates a user interface according to the present invention.

DETAILED DESCRIPTION OF THE PREFERRED EMBODIMENTS

Figure 1:
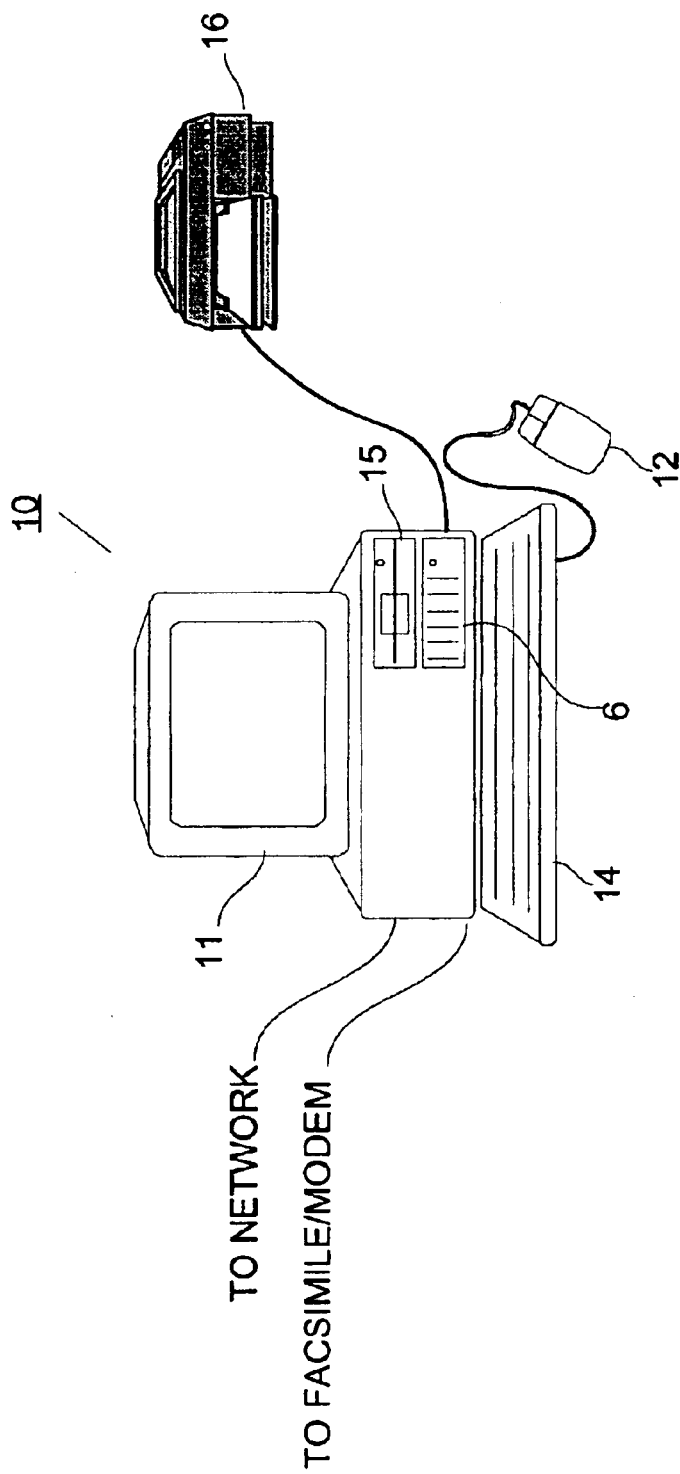
FIG. 1 is an outward view of a hardware environment embodying the present invention.

FIG. 1 is an outward view of representative computing hardware embodying the present invention. Shown in FIG. 1 are computer 10 executing an operating system, display monitor 11 for displaying text and images to a user, keyboard 14 for entering text and commands into computer 10, and mouse 12 for manipulating and for selecting objects displayed on display monitor 11, or for output to an output device such as printer 16. Also included with computer 10 are fixed disk drive 6, in which are stored application programs, such as a DBMS and other applications, data files, and device drivers for controlling peripheral devices attached to computer 10, floppy disk drive 15 for use in reading data from and writing data to floppy disks inserted therein. Data and/or applications may also be accessed from a CD-ROM via a CD-ROM drive (not shown) or over a network to which computer 10 may be connected (network connection not shown).

Figure 2:
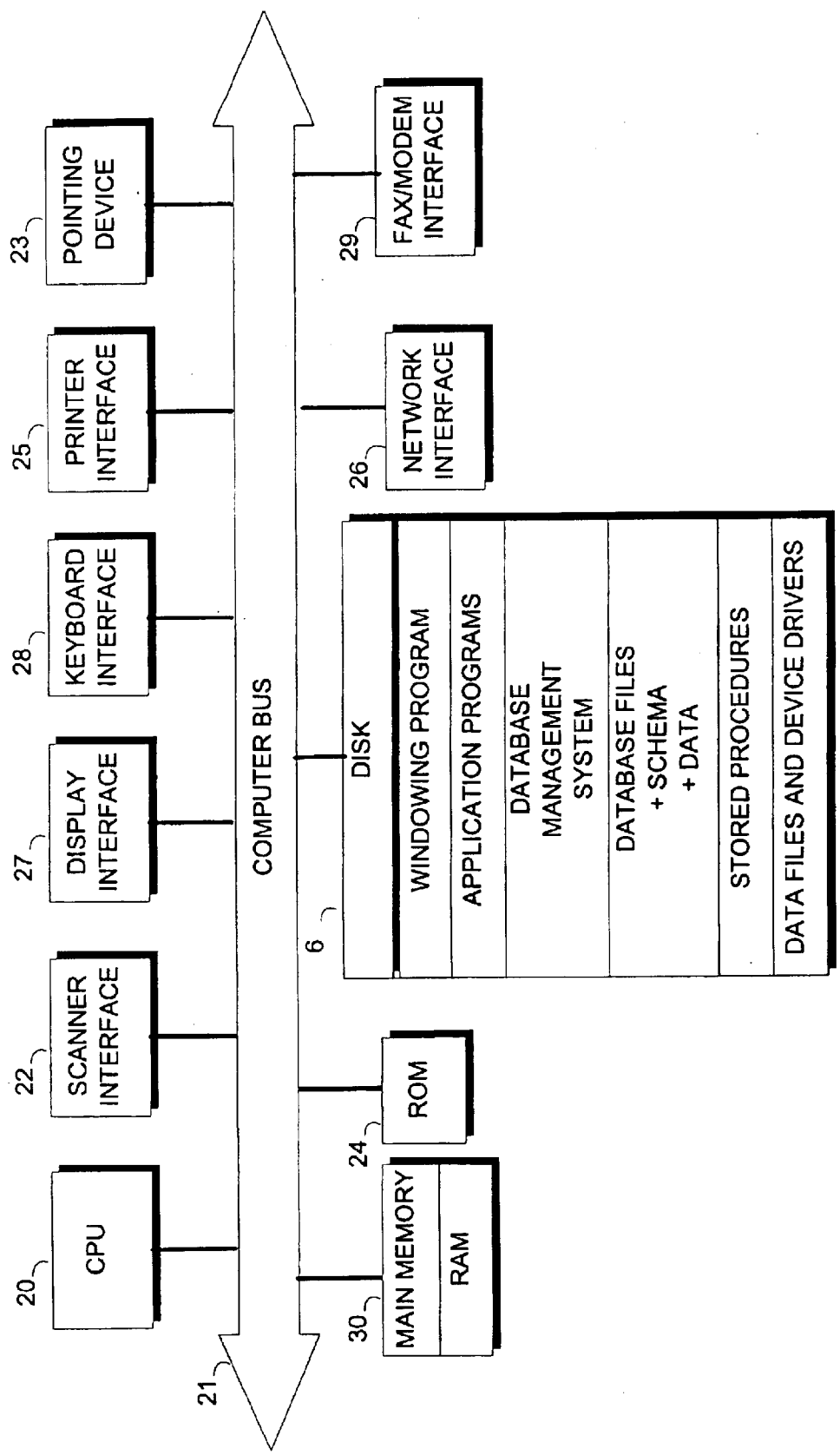
FIG. 2 is a block diagram of the internal architecture of a typical computer for use in conjunction with the present invention.

FIG. 2 is a block diagram of the internal architecture of computer 10. Shown in FIG. 2 are CPU 20, which may be any microprocessor including, but not limited to, a Pentium-type microprocessor, interfaced to computer bus 21. Also interfaced to computer bus 21 are printer interface 25, to allow computer 10 to communicate with printer 16, modem interface 29 to enable communications between computer 10 and a modem, display interface 27 for interfacing with display monitor 11, keyboard interface 28 for interfacing with keyboard 14, mouse interface 23 for interfacing with mouse 12, and network interface 26 for connecting to a network (e.g., Internet, intranet, local area network, etc.).

Read only memory (ROM) 24 stores invariant computer-executable process steps for basic system functions such as basic I/O, start up, or reception of keystrokes from keyboard 14.

Main random access memory (RAM) 30 provides CPU 20 with memory storage which can be accessed quickly. In this regard, computer-executable process steps of a DBMS or other application are transferred from disk 6 over computer bus 21 to RAM 32 and executed therefrom by CPU 20.

Also shown in FIG. 2 is disk 6 which, as described above, includes a windowing operating system, a DBMS which includes data stored therein as well as schema and data stored in one or more tables defined in the schema. Further, disk 6 may be used to store executable-code (e.g., stored procedures) comprising steps described herein for simultaneous display of a tabular and form view of data records and color encoding values. Disk 6 further includes data files and device drivers as shown.

The present invention provides a user interface for displaying record data wherein a tabular display portion displays plural data records. A form portion of the user interface comprises a display field corresponding to one of the plural data records. A value placed in the display field is encoded using a formatting or encoding scheme to reflect, or identify, characteristics of the data contained in the plural data records.

Thus, it is possible to achieve the benefits of both a tabular display and a form display as well as a status of some or all of the data in the tabular display within fields of the form display.

The present invention is described herein with reference to a color encoding scheme for use in a user interface. However, it should be apparent that any type of formatting and/or encoding may be used to visually identify characteristics of data used to populate fields of the user interface. For example, color, font size, font type, bold, italic, underline, etc. formatting may be used in any combination to uniquely identify a characteristic of the underlying data.

When the user selects multiple records from the tabular view, each field in the data entry form is populated with one or more colored data values to reflect characteristics of the values that exist in the selected records.

In a preferred aspect of the present invention, if none of the selected records have a value set for the field, the field is left blank. If all the records have the same value set, the common value is placed into the field in black, which indicates that the corresponding value in the selected records are set to the same value. If all the records have either the same value or no value set, that value is placed into the field in blue, which indicates that all records are set to the same value or not set at all. If multiple values are set for the field, "n" number of the values are placed into the field in red, which indicates that the records are set to different values, where "n" may be all or some number of the different values.

Color thus highlights difference and sameness of the values for a field across the entire record set without concern for the values themselves. In this way, the user can select some or all of a large set of records and determine from the color coding in the data entry form whether or not conflicts exist in the data and in so doing, quickly verify that the values have been properly set.

A user interface example is provided that includes a form display and a tabular display. Preferably, the form and tabular displays are displayed simultaneously. However, it is possible to display them at different times as well.

FIG. 3 illustrates a user interface according to the present invention. User interface 300 includes a form display 301 and a tabular display 302. User interface 300 is depicted using an exemplary layout. However, it should be apparent that any layout may be used for user interface 300. Further, while not depicted in user interface 300, tabular display 302 may be modified to provide a scrolling capability to display additional records or fields of the records.

Tabular display 302 includes entries 320 through 324 that display data from plural records (e.g., records from a relational database) However, the data displayed in user interface 300 may be obtained from any source (e.g., a file system, etc.) Fields 310 through 315 of tabular display 302 contain values retrieved from the plural data records.

Form display 301 includes fields 331 through 336 for displaying values from records 320 through 324 (i.e., fields 310 through 315, respectively). Fields 331 through 336 may display values from one or more of data records 320 through 324, or be blank. Further, fields 331 through 336 may be display-only or update fields.

Upon selection of one or more of records 320 through 324, the present invention populates fields 331 through 336 depending on the data contained in the selected records. Further, the values displayed in fields 331 through 336 are color encoded to further highlight the characteristics of the data of the selected records.

Figure 4:
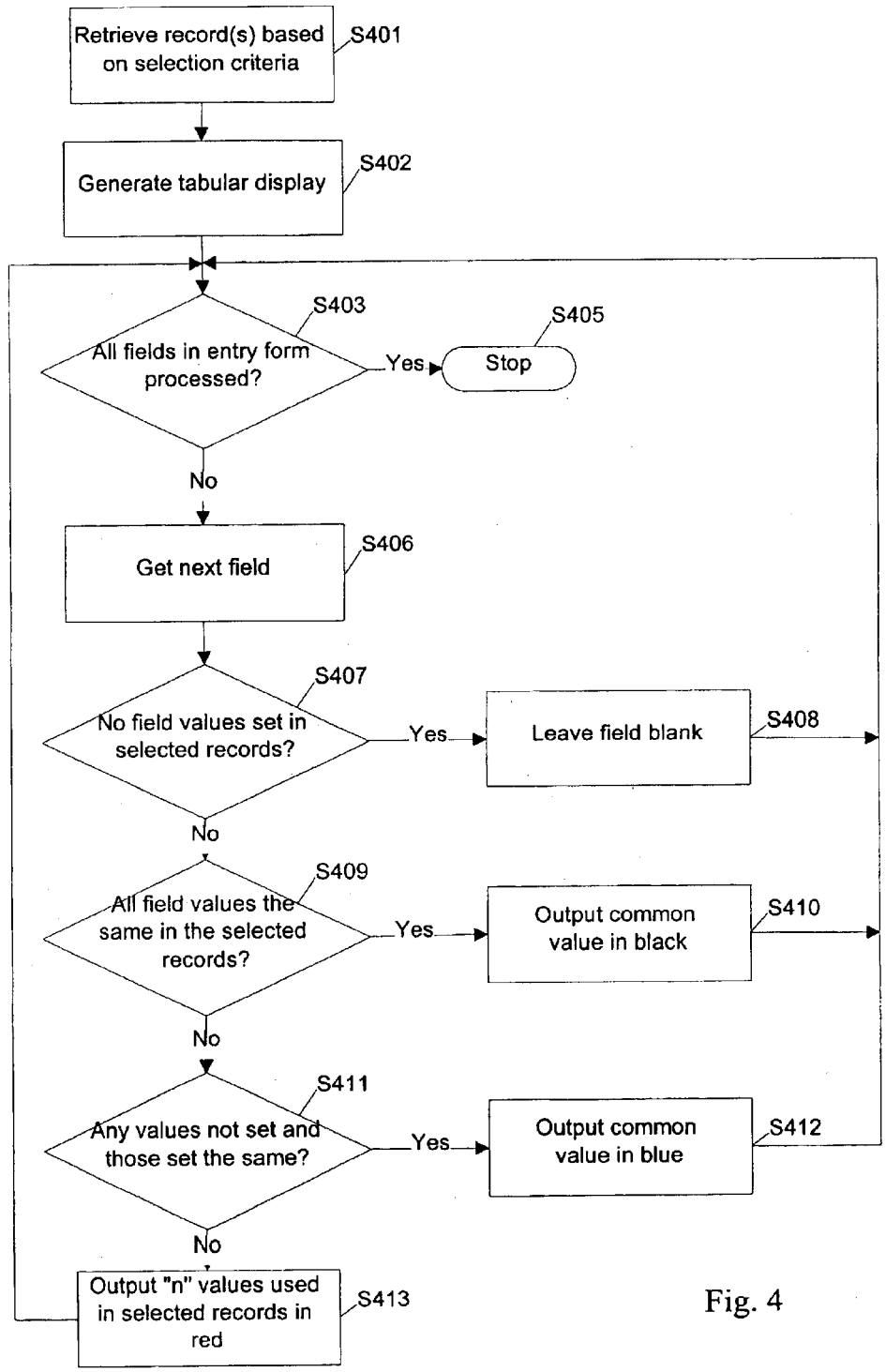
FIG. 4 provides a diagram of process steps for generating user interface 300 and responding to a selection of records of tabular display according to the present invention.

FIG. 4 provides a diagram of process steps for generating user interface 300 and responding to a selection of records of tabular display according to the present invention.

At step S401, the record data used to populate tabular display 302 are retrieved based on a selection criteria (e.g., selection criteria specified by the user of the user interface). At step S402, tabular display 302 is populated with the retrieved data.

Forms display 301 is populated with data from records selected from tabular display 302. Thus, upon selection of one or more records from tabular display 302, steps S403 through S413 are performed to generate forms display 301.

Forms display 301 displays one or more fields that are populated with data from the selected records. Each one of the fields in display 301 is processed to determine a format for the value, or values, to be displayed in the field. Therefore, at step S403, a determination is made whether all of the fields in forms display 301 have been processed. If so, processing ends at step S405.

If not, processing continues at step S406 to process the next field. At step S407, a determination is made whether any values have been set in the selected record fields (i.e., the fields from each of the selected records that correspond to the current display field) that corresponds to the current field of form display 301. If not, processing continues at step S403 to leave the display field blank. Processing continues at step S403 to process any remaining fields.

If it is determined, at step S407, that there is at least one value set in the selected record fields corresponding to the display field, processing continues at step S409. At step S409, a determination is made whether the values set in the selected record field(s) are the same. If so, processing continues to output the common value in the display field in black at step S410, and processing continues at step S403 to process any remaining display fields.

If it is determined, at step S409, that the selected records do not have a common value, processing continues at step S411. At step S411, a determination is made whether some of the selected record fields do not contain a value and those that do share the same value. If so, processing continues at step S412 to output the shared value in blue in the display form, and processing continues at step S403 to process any remaining display fields.

If it is determined that none of the criteria of steps S408, S409 and S411 are satisfied by the selected record fields, processing continues at step S413. That is, it is assumed that the selected record fields contain multiple, disparate values. In such a case, at step S413, "n" number of the values of the selected records field are displayed in the display field in red.

The number "n" (i.e., some or all of the values) values displayed in the display field may be determined by the size of the display field, the number of disparate values, etc. The size of the display field may be increased by providing a scrolling capability for scrolling through the values displayed in the display field. The selection of the values that are displayed may be determined by a preset criteria, or based on the values contained in the selected record fields. For example, the values selected may be based on the number of times a value appears in the record fields.

Assuming that all of records 320 through 324 are selected, display fields 331 through 336 are populated with blank, red, blue and black values as follows.

Since there are multiple values in fields 311 and 312, some number "n" of the values are displayed in display fields 332 and 331 (respectively) in red. The common value from field 313 is displayed in display field 334 in black. The value of records 322 and 324 is displayed in display field 335 in blue. Display field 336 is left blank.

Thus, it is possible for the user to quickly and easily ascertain the characteristics of the data contained in the selected records without the need to browse the data and examine each the records and the fields within the records to determine whether none or more values are set for a given field and/or some or all of the multiple values used in the fields. Such information may be used to easily assess whether or not to apply a change made in a display field of display form 301 to each of the data records, for example. Using the present invention, for example, it is easy for a user to determine, before applying the change to each of the data records, whether or not the existing data values for the field are all the same across the entire set of records.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method of displaying record data in a user interface comprising:

displaying a tabular portion of a user interface comprising plural data records;

displaying a form portion of the user interface comprising a display field that corresponds to a field of the plural data records;

determining whether to place a value in the display field; and, formatting a value in the display field to reflect characteristics of data contained in the plural data records wherein said formatting a value further comprises:

(a) formatting the value for display using a first format when it is determined that the plural data records share the same value;

(b) formatting the value for display using a second format when it is determined that a portion of the plural data records include a common value and a remaining portion of the plural data records have no value;

(c) formatting multiple values using a third format when it is determined that the plural data records include multiple values;

(d) displaying a blank value when it is determined that none of the plural data records include a data value.

2. The method according to claim 1, wherein the first format comprises a color of black.

3. The method according to claim 1, wherein the second format comprises a color of blue.

4. The method according to claim 1, wherein the third format comprises a color of red.

5. The method according to claim 1, wherein "n" of the multiple values are displayed in the display field.

6. The method according to claim 5, wherein "n" is a total number of the multiple values.

7. The method according to claim 5, wherein "n" is less than a total number of the multiple values.

8. A computer-readable memory medium in which computer-executable process steps are stored, the process steps for displaying record data in a user interface, wherein the process steps comprise:

a displaying step to display a tabular portion of a user interface comprising plural data records;

a displaying step to display a form portion of the user interface comprising a display field that corresponds to a field of the plural data records;

a determining step to determine whether to place a value in the display field; and, a formatting step to format the value in the display field to reflect characteristics of data contained in the plural data records wherein said formatting step further comprises:
  (a) a formatting step to format the value for display using a first format when it is determined that the plural data records share the same value;
  (b) a formatting step to format the value for display using a second format when it is determined that a portion of the plural data records include a common value and a remaining portion of the plural data records have no value;
  (c) a formatting step to format multiple values using a third format when it is determined that the plural data records include multiple values; and,
  (d) a displaying step to display a blank value when it is determined that none of the plural data records include a data value.

9. The computer-readable medium according to claim 8, wherein the first format is a color of black.

10. The computer-readable medium according to claim 8, wherein the second format is a color of blue.

11. The computer-readable medium according to claim 8, wherein the third format is a color of red.

12. The computer-readable medium according to claim 8, wherein "n" of the multiple values are displayed in the display field.

13. The computer-readable medium according to claim 12, wherein "n" is a total number of the multiple values.

14. The computer-readable medium according to claim 12, wherein "n" is less than a total number of the multiple values.

15. Computer-executable process steps stored on a computer-readable medium, the process steps for displaying record data in a user interface, wherein the process steps comprise:
  code to display a tabular portion of a user interface comprising plural data records;
  code to display a form portion of the user interface comprising a display field that corresponds to a field of the plural data records;
  code to determine whether to place a value in the display field; and,
  code to format the value in the display field to reflect characteristics of data contained in the plural data records wherein the code to format thee value further comprises:
    (a) code to format the value for display using a first format when it is determined that the plural data records share the same value;
    (b) code to format the value for display using a second format when it is determined that a portion of the plural data records include a common value and a remaining portion of the plural data records have no value;
    (c) code to format multiple values using a third formal when it is determined that the plural data records include multiple values; and,
    (d) code to display a blank value when it is determined that none of the plural data records include data value.

16. The computer-executable process steps according to claim 15, wherein the first format is a color of black.

17. The computer-executable process steps according to claim 15, wherein the second format is a color of blue.

18. The computer-executable process steps according to claim 15, wherein the third format is a color of red.

19. The computer-executable process steps according to claim 15, wherein "n" of the multiple values are displayed in the display field.

20. The computer-executable process steps according to claim 19, wherein "n" is a total number of the multiple values.

21. The computer-executable process steps according to claim 19, wherein "n" is less than a total number of the multiple values.

* * * * *